No. 865,515. PATENTED SEPT. 10, 1907.
M. A. MUNCY.
CREAM COOLER.
APPLICATION FILED MAY 13, 1907.
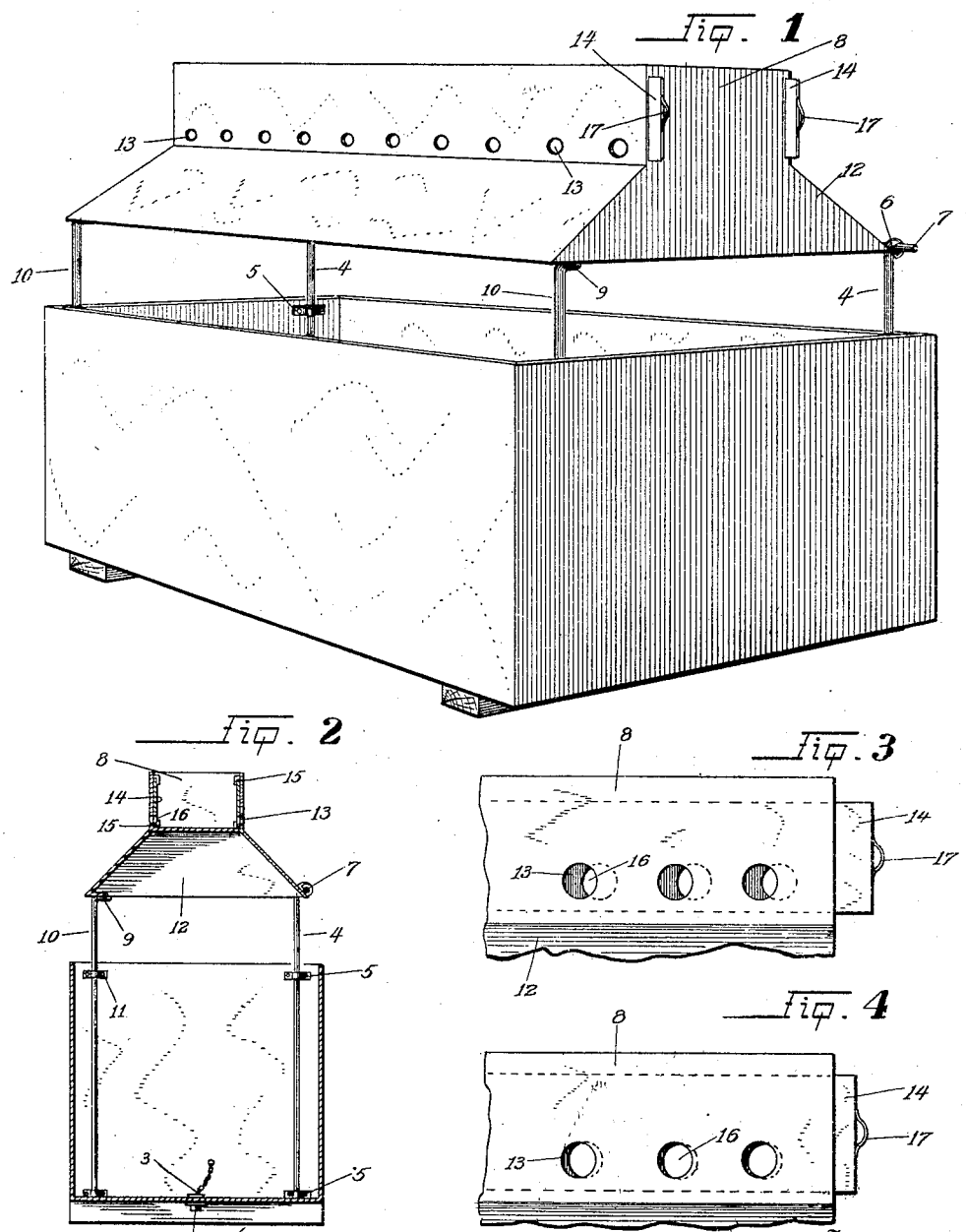

UNITED STATES PATENT OFFICE.

MARTHA A. MUNCY, OF ESCALON, CALIFORNIA.

CREAM-COOLER.

No. 865,515.   Specification of Letters Patent.   Patented Sept. 10, 1907.

Application filed May 13, 1907. Serial No. 373,202.

*To all whom it may concern:*

Be it known that I, MARTHA A. MUNCY, a citizen of the United States, residing at Escalon, in the county of San Joaquin and State of California, have invented certain new and useful Improvements in Cream-Coolers; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in cream coolers and particularly to a device used for cooling cream in dairies and creameries, my object being to produce such a device as will keep the cream cool in hot weather in a simple and inexpensive, yet effective, manner. This main object and many minor ones I accomplish by means of a large lower receptacle adapted to receive the cream cans and a means upward therefrom for trickling cool water over said cans into said receptacle, the evaporation caused thereby keeping the cans and cream cool; also by such other and further construction as will appear by a perusal of the following specifications and claims.

In the drawings similar characters of reference indicate corresponding parts in the several views.

Figure 1 is a perspective view of the complete device. Fig. 2 is a vertical section of the device. Figs. 3 and 4 are fragmentary views of a slide water regulator.

Referring more particularly to the reference characters on the drawings 1 designates a large lower receptacle adapted to receive the cream cans, said receptacle having a drain pipe 2 provided with a plug 3. Near the rear side of said receptacle 1 are removably secured upright rods 4 by means of metal straps 5. The rods 4 are provided at their upper ends with rings 6 in which are swingingly mounted rods 7 to which is secured an inclined water shed 8 resting at its front ends on flat plates 9 held upward by rods 10 removably secured to the receptacle 1 by means of straps 11. The outer contour of the shed 8 is of a lesser dimension than the inner contour of the receptacle 1 for a purpose as will appear.

Upward from the water shed 8 is an elongated basin or trough 12 having a series of orifices 13 disposed in its sides near the bottom thereof.

14 are slide plates adjustably disposed in the trough 12 by means of grooved plates 15, said plates 14 having a plurality of orifices 16 normally coinciding with the orifices 13. Said side plates 14 extend through one end of the trough 12 and are provided with handle members 17.

In practice when it is desired to use the device the shed 8 is tilted backward by means of its hinge connection 6—7 and the cans of cream or milk are placed in the receptacle 1, the shed 8 being then returned to its normal resting position on the plates 9. Water is then permitted to flow into the trough 12 from which it trickles through the orifices 13 onto the shed 8, from which by reason of the contour thereof being smaller than the inner contour of the receptacle 1, the water runs into the said receptacle 1 around the said cans of cream or milk. Thus by reason of the law of evaporation the device and the water becomes exceedingly cool, thus keeping the cream or milk cool and hence sweet and pure.

The slide plates 14 may be operated to regulate the flow through the orifices 13 as shown in Figs. 3 and 4.

The removable rods 4 and 10 permit of the shed 8 being raised or lowered according to the height of the cans placed in the receptacle 1. When it is desired to drain the water from the receptacle 1 the plug 3 may be removed.

Thus it will be seen that I have produced a cream cooler which substantially fulfils all the objects of the invention as set forth herein.

While this specification sets forth the present and preferred construction of my device in detail, still in practice many small deviations from such detail may be resorted to without departing from the spirit of my invention.

Having thus described my invention, what I claim as new and useful and desire to secure by Letters Patent is:—

1. In a device of the kind described a lower receptacle upright bars removably secured at the front and rear of said receptacle, a water shed hinged to said rear rods, and adapted to rest on said front rods, and a water trough on the top of said water shed provided with a plurality of water holes in its sides, as set forth.

2. In a device of the character described a lower receptacle, upright rods removably secured to the front and rear of said receptacles, rings formed on the top of said rear rods, plates formed on the top of said front rods, a water shed, rods on said shed disposed in said rings, said shed resting normally on said plates, and a water trough secured to the top of said shed and provided with a plurality of water holes in its sides, as set forth.

3. In a device of the character described a lower receptacle, a water shed held upward therefrom, means for tilting said water shed upward, a water trough disposed on the top of said shed and provided with a plurality of water holes in its sides, slide plates disposed in the sides of said trough and provided with a plurality of holes adapted to be normally in alinement with said first named holes, as specified.

4. In a device of the character described a lower receptacle, a water shed held upward therefrom, a trough disposed along the apex of said shed, said trough being provided with a plurality of orifices in its sides adapted to spray water over said shed, as described.

In testimony whereof I affix my signature in presence of two witnesses.

MARTHA A. MUNCY.

Witnesses:
 FRANK H. CARTER,
 PERCY S. WEBSTER.